United States Patent
Jackson et al.

(10) Patent No.: US 6,434,149 B1
(45) Date of Patent: Aug. 13, 2002

(54) SYSTEM AND METHOD FOR REMOVING DATA TRAFFIC FROM A TELEPHONE NETWORK

(75) Inventors: Cary D. Jackson, Laguna, CA (US); Eric W. Hager, Boulder, CO (US); Steven M. Willens, Pleasanton, CA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/108,800

(22) Filed: Jul. 1, 1998

(51) Int. Cl.[7] ............................................... H04L 12/56
(52) U.S. Cl. ...................................................... 370/395
(58) Field of Search ................................. 370/389, 395, 370/396, 397, 399, 465, 486, 468, 474, 476, 475, 350, 503, 351, 252–256, 353–357, 360, 400, 401, 466–469, 471, 473, 908, 904, 902, 901, 910, 911; 379/93.01, 93.02, 93.03, 93.09, 93.14, 93.15, 219, 225, 226, 231, 230, 242

(56) References Cited

U.S. PATENT DOCUMENTS

| | | | | |
|---|---|---|---|---|
| 5,802,278 A | | 9/1998 | Isfeld et al. ............ | 395/200.02 |
| 5,931,928 A | * | 8/1999 | Brennan et al. ............. | 370/401 |
| 6,091,737 A | * | 7/2000 | Hong et al. .................. | 370/431 |

FOREIGN PATENT DOCUMENTS

| | | | |
|---|---|---|---|
| EP | 0530394 A1 | 9/1991 | ........... G06F/15/16 |
| EP | 0 889 630 A3 | 1/1999 | ........... H04M/7/12 |
| EP | 0 889 630 A2 | 1/1999 | ........... H04M/7/12 |
| WO | WO 97/39563 | 10/1997 | ........... H04M/7/06 |
| WO | WO 99/00945 | 1/1999 | ........... H04L/12/46 |

OTHER PUBLICATIONS

R. Droms, "Dynamic Host Configuration Protocol", Oct. 1993, pp. 1–34.*
"Too Much of a Good Thing?" Exchange Magazine, Fall 1996, URL:http://www.bellcore.com/BC.dynjava?Good ThingEAGeneralExchangeArticle, Copyright 1998, 5 pgs.
International Search Report for PCT Appl. No. PCT/US99/15008.

* cited by examiner

Primary Examiner—Dang Ton

(57) ABSTRACT

A data bypass system for removing data traffic from a public switched telecommunications network designed for carrying voice traffic includes a remote access concentrator for receiving a modulated signal corresponding to the data traffic, demodulating the signal to recover the link layer frames that comprise the data traffic, and tunneling the link layer frames through a data network to a network access controller for extracting compressed data contained within the link layer frames, decompressing the compressed data, performing error correction, performing protocol processing, and transmitting the decompressed data to a data terminal device.

14 Claims, 7 Drawing Sheets

SYSTEM AND METHOD FOR REMOVING DATA TRAFFIC FROM A TELEPHONE NETWORK

BACKGROUND OF THE INVENTION

1. Field of the Invention

The present invention relates generally to the field of data communications.

2. Related Art

With the advent of the personal computer and the tremendous popularity of the Internet and on-line services, the number of computers connected to the public switched telephone network (PSTN) has grown immensely over the past decade. It is estimated that 20–30% of all calls placed on the telephone network are established for the purpose of allowing one terminal or computer device to communicate with another computer device. These calls are known as data calls. The characteristics of a data call are unlike the characteristics of voice calls. A voice call normally lasts for 3 centennial call seconds (CCS), which is about five minutes, whereas a data call normally lasts for 36 CCS (about an hour). This presents a problem because the telephone network was not designed for handling the relatively long duration data calls. Consequently, as result of the tremendous increase in the number of data calls served by the phone network, the network is increasingly being overloaded.

FIG. 1 illustrates a representative overloaded PSTN 102. PSTN 102 comprises a plurality of central office switches (CO) 110, 112, 114, 116 and at least one STP/SCP node 118. Each CO has a serving area, which is the geographical area in which the CO is located: all subscribers in that area are served by that CO.

FIG. 1 shows a user 103 that desires to connect data terminal device 104 with remote data terminal device 124 using PSTN 102. Data terminal device 104 is connected to PSTN CO 110 through data communication device 106, such as a modem, and dial media 108.

In order to establish a connection between data terminal device 104 and remote data terminal device 124, data terminal device 104 directs data communication device 106 to place a call to remote access server (RAS) 120 using PSTN 102. Data communication device 106 places a call to RAS 120 by sending a call request to PSTN CO 110. Upon receiving the call request from data communication device 106, the PSTN establishes a circuit from the originating CO 110 to RAS 120 through terminating CO 114. RAS 120 is connected to data network 122, which is connected to remote data terminal device 124.

RAS 120 provides full data call establishment by performing the reverse of the processes performed by data communication device 106. The processes performed by data communication device 106 includes the processes of: (1) data compression; (2) error correction; (3) link layer framing; and (4) modulation, in that order. Thus, RAS 120 provides full data call establishment by performing the following steps in the following order: (1) demodulation; (2) link layer framing; (3) error correction; and (4) data decompression.

Modulation refers to the conversion of a binary bit stream into a modulated signal within the voice frequency range. The facilities of a PSTN are designed to handle voice traffic, not binary data. Thus, to transmit binary data through the phone network it is necessary to perform the process of modulation. The modulated signal is then used to "carry" the binary data through the phone network. Demodulation refers to the process of converting a modulated signal back into the original binary data. Consequently, a modulator/demodulator (i.e., modem) is necessary to transmit binary data from one computer to a second computer through the phone network.

The process of link layer framing refers to a process of encapsulating data within a frame for transmission on the physical layer. Encapsulating data within a frame enables the error correction processing.

After the call is established by RAS 120, data communication device 106 accepts user data from data terminal device 104 for transmission to RAS 120. Data communication device 106 prepares the user data for transmission over the PSTN by first encapsulating the data in a protocol (such as PPP), compressing the encapsulated data, applying error control, framing the data in a link layer frame, and modulating the link layer frame. RAS 120 receives the modulated signal, demodulates the signal to recover the link layer frame, removes the link layer framing, checks for errors, decompresses the data, and de-encapsulates the call to recover the user data in its original form. The user data is then forwarded to remote data terminal device 124 through data network 122.

The circuit set up between CO 110 and CO 114 remains in use until data communication device 106 terminates the call and releases the circuit, regardless of whether actual data is being transmitted. Thus, valuable PSTN circuits are consumed from data communication device 106 to local CO 110, between originating CO 110 to terminating CO 114, and from terminating CO 114 to the RAS.

To conserve valuable PSTN circuits, what is needed is a system to bypass the PSTN by capturing data calls at the originating CO and transmitting the compressed user data associated with the data call through a data network to a device that will then decompress the data and transmit the decompressed data to the intended destination.

SUMMARY OF THE INVENTION

In a system wherein a data communication device receives user data from a data terminal device, compresses the user data, encapsulates the compressed user data within a link layer frame, and transmits a modulated signal corresponding to the link layer frame to a switch within a telephone circuit switch network, the present invention provides a system for transporting the compressed form of the user data through a data network, thereby bypassing the telephone network.

The present invention includes a remote access concentrator (RAC) connected to a network access controller (NAC) through the data network. The RAC is connected to the switch within the telephone network and includes a network interface for receiving the modulated signal from the switch. The RAC also includes a demodulator to demodulate the modulated signal so as to recover the link layer frame. After recovering the link layer frame, the RAC tunnels the link layer frame through the data network to the NAC. Since the link layer frame contains the compressed form of the user data, the compressed user data is transported through the data network.

The NAC receives the tunneled link layer frame from the RAC and extracts the compressed user data from the link layer frame. The NAC then decompresses the compressed user data to recover the user data in its original form. The user data is then processed by the NAC according to the user data type. Finally, the NAC forwards the user data to the remote data terminal device.

The invention supports a variety of user data types, including: Asynchronous data, Point to Point Protocol (PPP), and Serial Line Internet Protocol (SLIP). The invention's ability to support a variety of data types is based on the RAC tunneling the link layer frame to the NAC, such that the RAC does not directly process the user data.

In a first embodiment of the present invention, the switch within the telephone network is a CO. In a second embodiment of the present invention, the switch is a Competitive Local Exchange Carrier (CLEC) switch.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

DETAILED DESCRIPTION OF THE PREFERRED EMBODIMENTS

The system of the present invention captures data calls at an entrance of the public switched telephone network (PSTN) (e.g., the originating CO) and transports the compressed form of the user data associated with the data call through a data network, thereby bypassing the PSTN. The advantage of this invention is that the consumption of PSTN interconnect circuitry is reduced and that the user data is transported in its compressed form though a data network.

Figure 1:
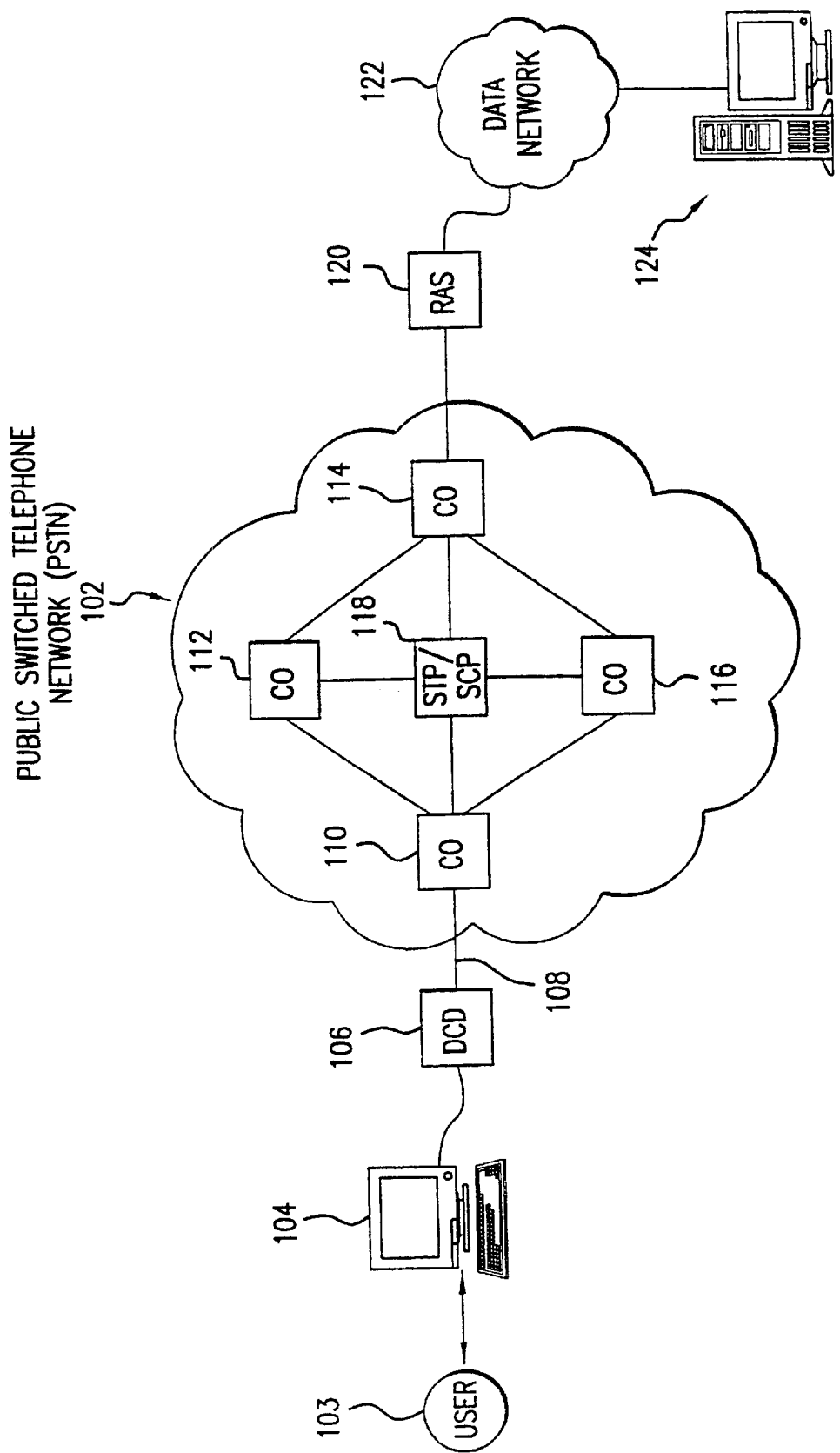
FIG. 1 illustrates a representative public switched telephone network.
Figure 2:
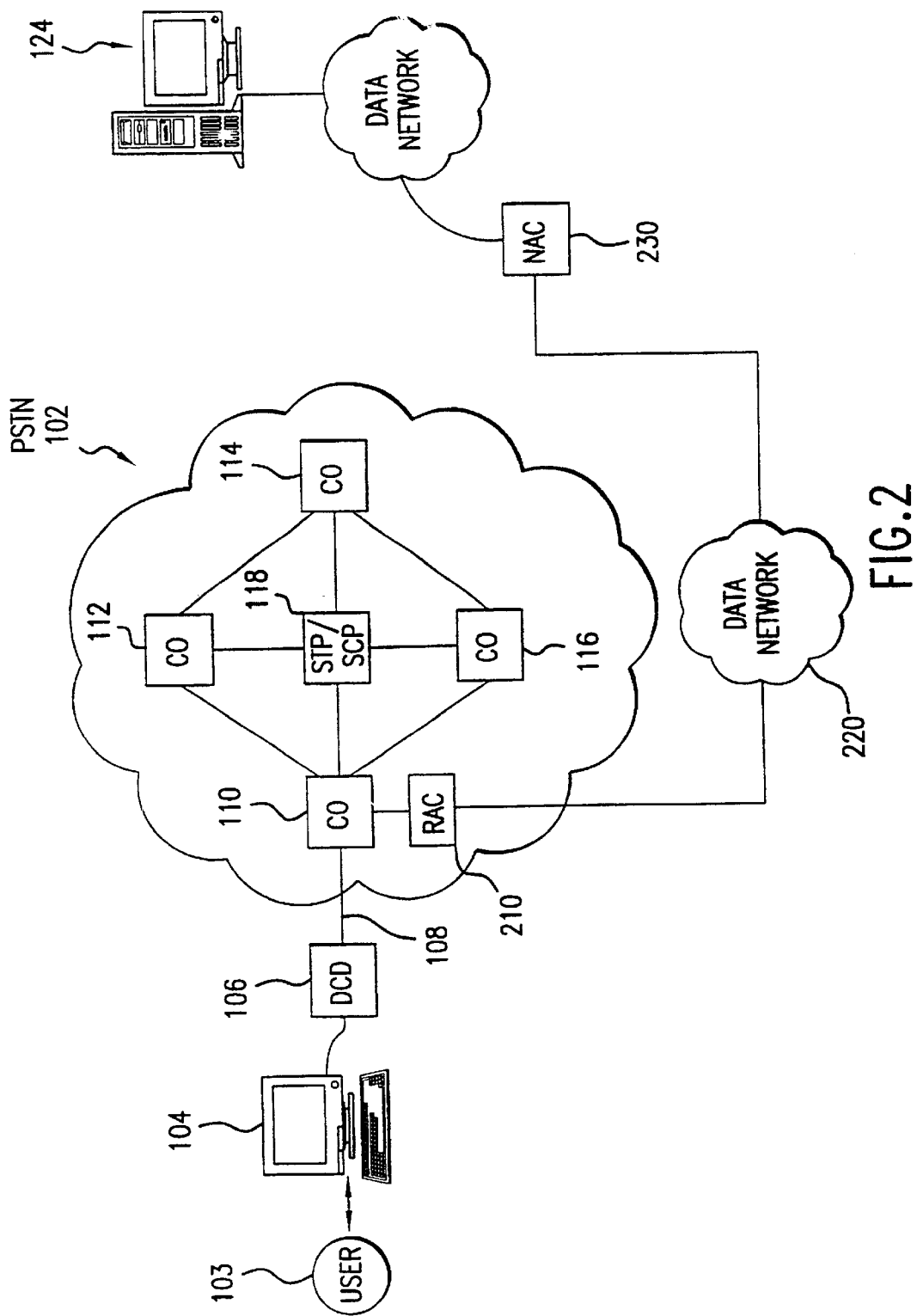
FIG. 2 illustrates a network configuration according to a first embodiment of the present invention.

FIG. 2 illustrates an overview of an embodiment of the present invention. The present invention includes a remote access concentrator (RAC) 210, a data network 220, and a network access controller (NAC) 230.

RAC 210 is connected to data terminal device 104 though originating CO 110 and to NAC 230 through data network 220. RAC 210 is locally connected to CO 110. Although it is not shown, each CO 112, 114, 116 can have a locally connected RAC to service users in each COs respective geographic areas. NAC 230 is connected to remote data terminal device 124 through data network 122. Because RAC 210 is locally connected to CO 110, the only PSTN circuits that will be consumed are the circuits from data communication device 106 to originating CO 110, and the circuits between originating CO 110 and RAC 210.

Data terminal device 104 includes but is not limited to such devices as personal computers, laptop computers, and workstations. Similarly, data communication device 106 includes but is not limited to such devices as analog or digital modems, ISDN terminal adapters, or wireless modems. It should also be noted that data terminal device 104 and data communication device 106 can form one integral unit or can exist as two separate units.

The invention essentially splits the functionality of the typical RAS 120 into two new parts: RAC 210 and NAC 230. RAC 210 performs the link layer and modulation/demodulation functions of RAS 120, while NAC 230 performs the link layer functions and all functions existing above the link layer, such as error correction and data compression/decompression.

The link layer is the optimum area in which to split the RAS 120 functionality because the users data is compressed at that layer and the link layer consists of uniform frames. Because RAC 210 does not perform any functions above the link layer (e.g., RAC 210 does not perform data decompression) RAC 210 is able to transmit the compressed user data to NAC 230 for further processing. Consequently, the system of the present invention utilizes fewer data network resources than a system where the user data is transported in its uncompressed form. Substantial cost savings and efficiency gains are thereby realized. Additionally, RAC 210 is completely protocol independent because it does not process above the link layer.

Figure 3:
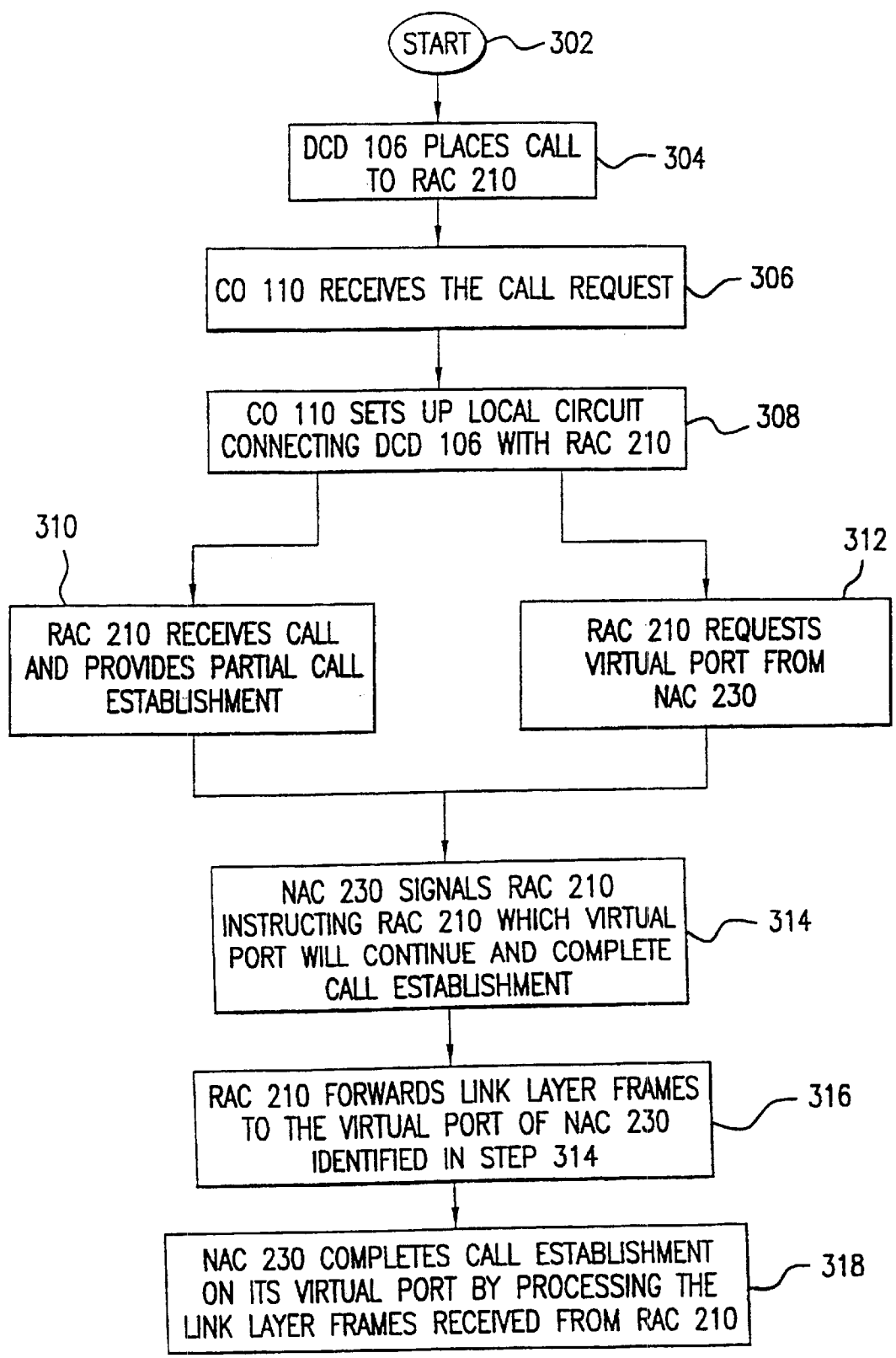
FIG. 3 illustrates a procedure, according to the present invention, for providing call establishment.

FIG. 3 illustrates a procedure, according to the present invention, for providing call establishment when data terminal device 104 initiates a data call to remote data terminal 124.

The procedure begins at step 302 where control immediately passes to step 304. In step 304 data terminal device 104 directs data communication device (DCD) 106 to place a call to RAC 210 using PSTN 102. In step 306 a call request is received at CO 110 and in step 308 CO 110 will set up a local circuit connecting DCD 106 to RAC 210. After step 308 control passes to steps 310 and 312 in parallel. In step 310, RAC 210 receives the call and uniquely provides partial data call establishment by demodulating the modulated signal transmitted by DCD 106 and by performing link layer framing. In step 312, RAC 210 contacts the associated NAC 230 over data network 220 to request a virtual port for the continuation of matching and completing the remainder of call establishment. Instep 314 NAC 230 signals RAC 210 instructing RAC 210 which virtual port will continue and complete the call establishment. After step 314, RAC 210 and NAC 230 are connected via data network 220. In step 316, RAC 210 forwards the link layer frames transmitted by DCD 106 to NAC 230 so that NAC 230 can complete call establishment. RAC 210 forwards the link layer frames through data network 220. In step 318, NAC 230 completes call establishment on its virtual port by processing the link layer frames received from RAC 210.

After the call is established by RAC 210 and NAC 230, DCD 106 will begin accepting user data from terminal device 104 for transmission to RAC 210, and ultimately for transmission to remote data terminal 124.

Figure 4:
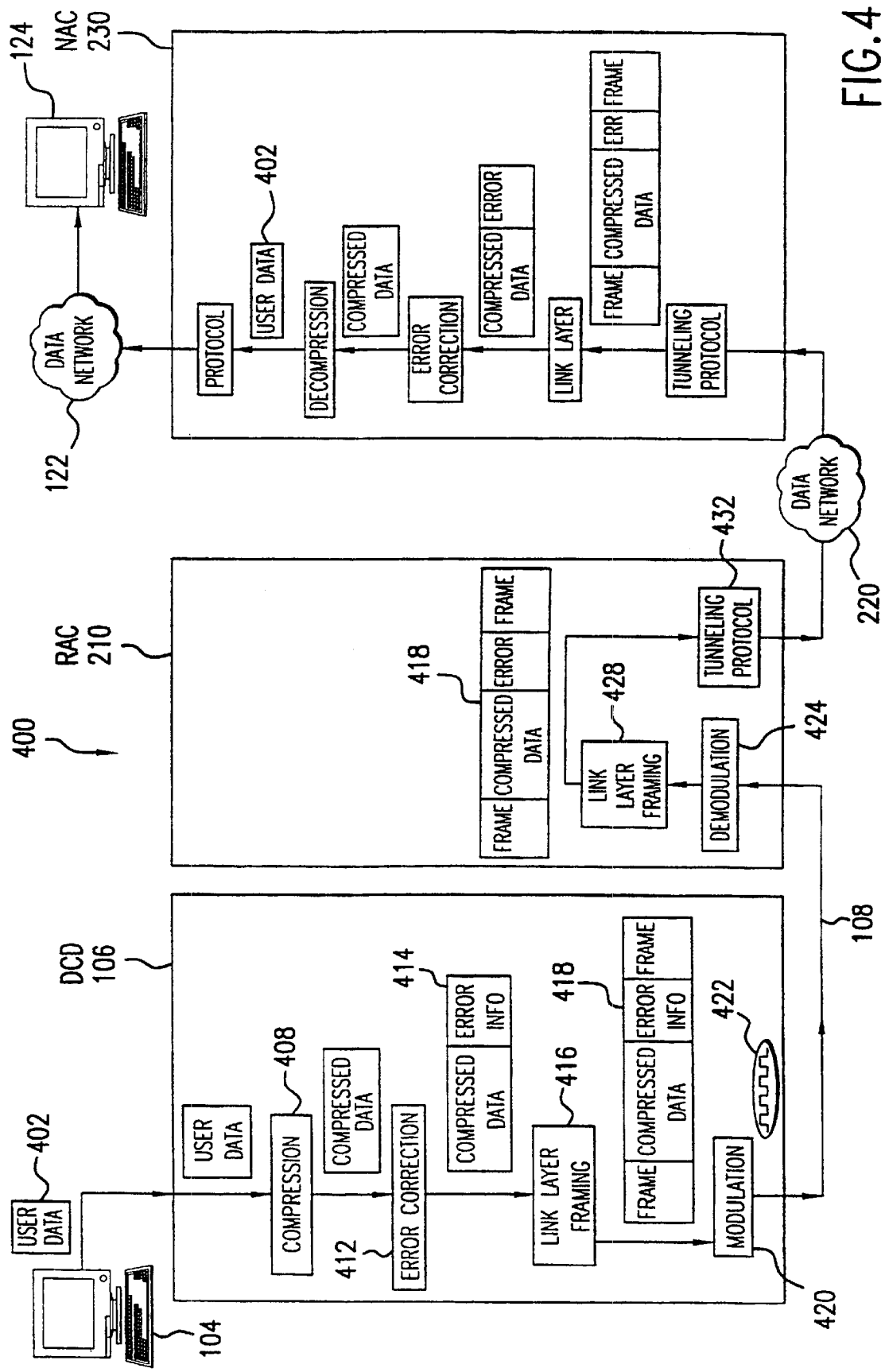
FIG. 4 illustrates the flow of data from data terminal 104 to remote data terminal 124, according to the present invention.

FIG. 4 illustrates the flow of data from data terminal 104 to remote data terminal 124, according to the present invention. FIG. 4 also illustrates how the functionality previously performed by RAS 120 is now performed by RAC 210 and NAC 230.

Data terminal device 104 generates user data 402, which is sent to DCD 106 for transmission to remote data terminal 124. The present invention supports a variety of user data 402 types, including: Asynchronous data, Point to Point Protocol (PPP), and Serial Line Internet Protocol (SLIP).

Upon receiving user data 402, DCD 106 performs data compression 408. A compression algorithm commonly implemented in data communication devices is the V.42bis compression standard. However, other compression algorithms are contemplated by the present invention.

After compressing the data, DCD 106 typically adds error correction information 414 to the compressed data 412. As an example, DCD 106 employs the V.42 error correction standard. The compressed data and the error correction information 414 are then encapsulated within a link layer frame 418. Link layer frame 418 is modulated 420 to produce modulated signal 422 for transmission on to dial media 108. Dial media 108 can include, for example, plain old telephone service (POTS), integrated services digital network (ISDN) services, and analog and digital wireless services. A variety of modulation schemes 420 can be used by DCD 106. An example modulation scheme is the V.34 standard. Other modulation schemes are contemplated by the present invention, such as ISDN modulation schemes.

Modulated signal 422 passes through CO 110 and is received at RAC 210. RAC 210 performs demodulation 424 and link layer processing 428 so as to recover link layer frame 418. After recovering link layer frame 418, RAC 210 will tunnel link layer frame 418 through data network 220 to NAC 230. RAC 210 tunnels link layer frame 418 through data network 220 by encapsulating it in a data network protocol. A variety of protocols may be used to tunnel link layer frame 418. Such protocols include but are not limited to TCP, ATM, and Frame Relay.

NAC 230 will receive the data network protocol encapsulated link layer frame and remove the protocol encapsulation to recover link layer frame 418. NAC 230 will then extract the compressed user data and error correction information 414 from link layer frame 418. Next, NAC 230 will use the error correction information 414 to fix errors that may have occurred during transmission. Following that step, NAC 230 will decompress the compressed user data. Next, NAC 230 will perform protocol processing corresponding to the type of user data 402 transmitted by data terminal device 104. For example, if user data 402 is of the PPP protocol type, NAC 230 will perform PPP processing. Finally, NAC 230 forwards user data 402 to remote data terminal 124 via data network 122.

As is evident from data flow diagram 400, the compressed form of user data 402 is transported through data network 220. By transporting the compressed form of user data 402 through data network 220, as opposed to the un-compressed form, cost savings and efficiency gains are realized because a smaller amount of data traverses data network 220. For example, the V.42bis compression algorithm yields approximately a 4:1 compression ratio.

Figure 5:
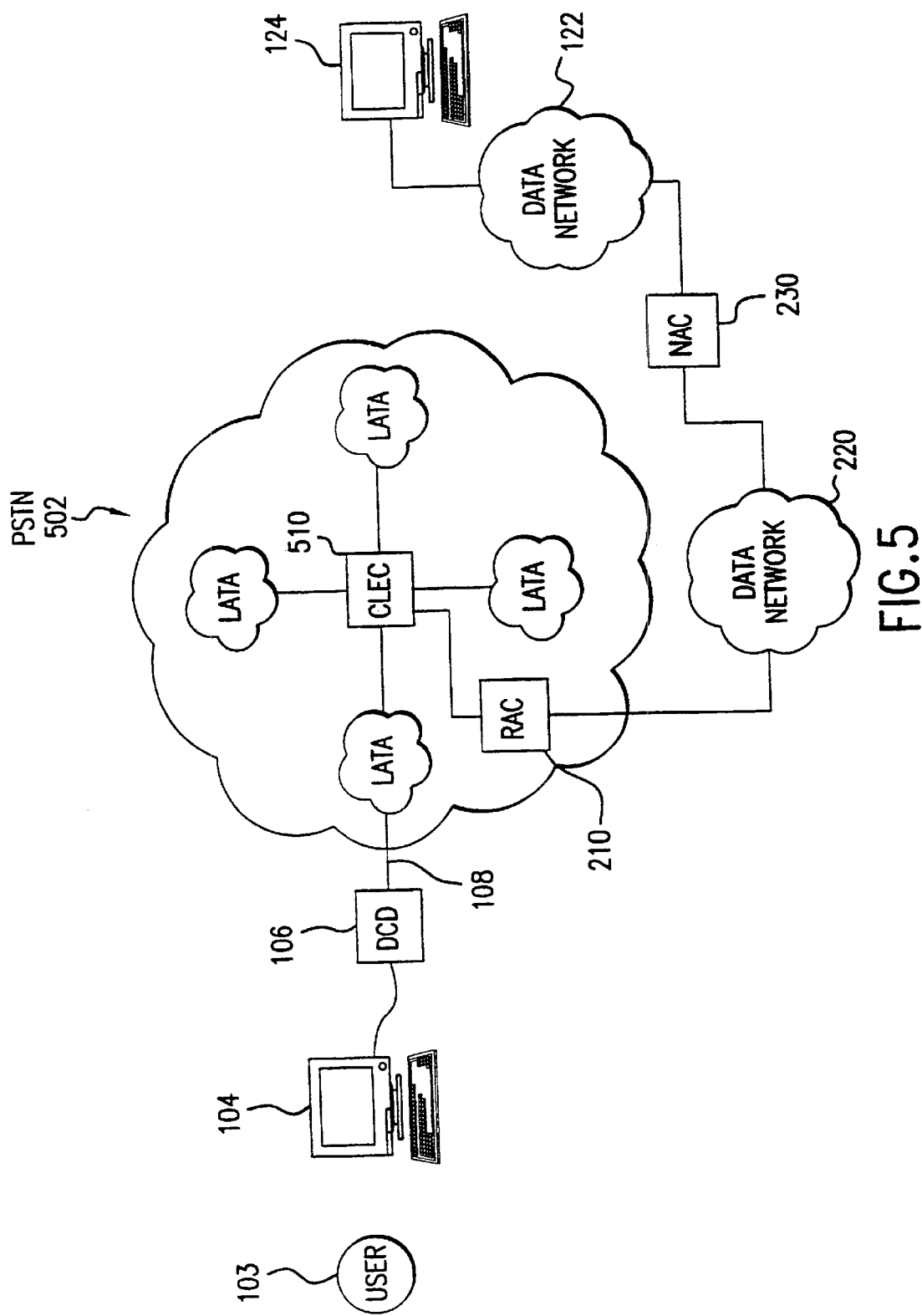
FIG. 5 illustrates a second embodiment of the present invention.

FIG. 5 illustrates another environment in which the present invention is useful. In this environment, RAC 210 is connected to a competitive local exchange carrier (CLEC) switch 510 instead of a CO. CLEC 510 is connected to a plurality of local access and transport areas (LATA). The present invention functions exactly the same in the environment illustrated in FIG. 5 as it does in the environment shown in FIG. 2. Thus, the process of FIG. 3 and the data flow diagram of FIG. 4 require no modification to operate in the environment shown in FIG. 5.

Figure 6:
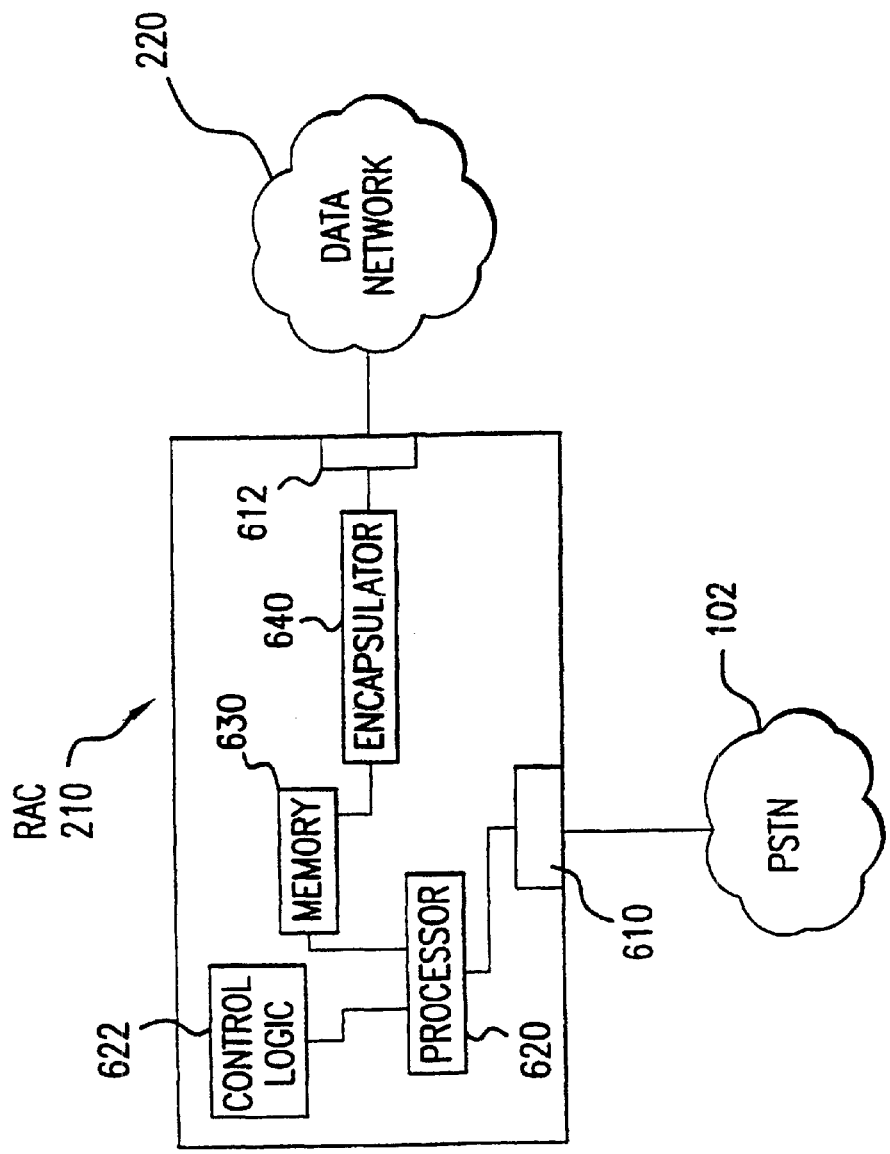
FIG. 6 is a diagram further illustrating a remote access concentrator.

FIG. 6 is a diagram illustrating a more detailed view of RAC 210. RAC 210 includes: network interface 610 for connecting to a PSTN switch, such as a CO 110 or CLEC 510; network interface 612 for connecting to a data network; processor 620; control logic 622 for enabling processor 620 to demodulate the signal received from DCD 106; memory 630 for storing link layer frames 418; and encapsulator 640 for removing frames from memory and encapsulating the frames within a data network protocol so that the frame can be tunneled through a data network to a virtual port of NAC 230. In the preferred embodiment, processor 620 is a digital signal processor. The implementation of control logic 622 is well known in the art.

Figure 7:
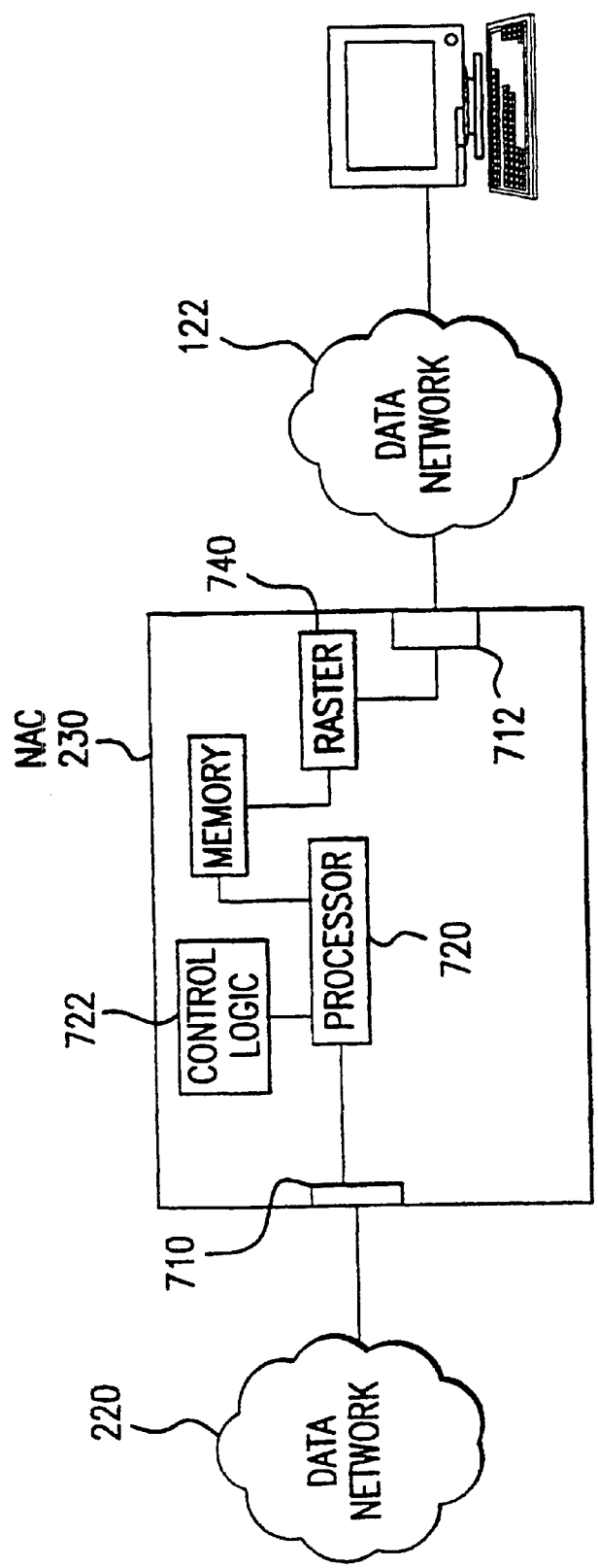
FIG. 7 is a diagram further illustrating a network access controller.

FIG. 7 is a diagram illustrating a more detailed view of NAC 230. NAC 230 includes: network interface 710 for connecting to data network 220; network interface 712 for connecting to Internet type network 122; processor 720; control logic 722 for enabling processor 720 to process the tunneled link layer frames received from RAC 210 and to decompress user data; memory 730 for storing user data; and routing mechanism 740 for forwarding user data to data terminal device 124 connected to data network 122.

While various embodiments of the present invention have been described above, it should be understood that they have been presented by way of example, and not limitation. It will be understood by those skilled in the relevant art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. In a system having a data communication device connected to a switch within a telephone circuit switch network, wherein the data communication device receives user data from a data terminal device for transmission to a remote data terminal device, compresses the user data, encapsulates the compressed user data within a link layer frame, and transmits a modulated signal corresponding to the link layer frame to the switch, a system for transporting the compressed form of the user data through a data network, thereby bypassing the telephone network, comprising:

a remote access concentrator connected to the switch and to the data network, wherein the remote access concentrator includes a first network interface for receiving the modulated signal, means for demodulating the modulated signal to recover the link layer frame, and means for tunneling the link layer frame through the data network.

2. The system of claim 1, further comprising a network access controller connected to the data network, wherein the network access controller includes means for receiving the tunneled link layer frame, means for extracting the compressed user data from the link layer frame, means for decompressing the compressed user data, and means for transmitting the user data to the remote data terminal.

3. The system of claim 1, wherein said means for tunneling include an encapsulator to encapsulate the link layer frames within a protocol.

4. The system of claim 3, wherein said protocol is selected from the group of: TCP, ATM, and Frame Relay.

5. In a system having a data communication device connected to a switch within a telephone circuit switch network, wherein the data communication device receives user data from a data terminal for transmission to a remote data terminal device, compresses the user data, encapsulates the compressed user data within a link layer frame, and transmits a modulated signal corresponding to the link layer frame to the switch, a method for transporting the compressed form of the user data through a data network, comprising the steps of:

(a) receiving the modulated signal from the switch;

(b) demodulating the modulated signal to recover the link layer frame;

(c) encapsulating the link layer frame in a protocol;

(d) transmitting said encapsulated link layer frame through the data network to a network access controller;

(e) receiving said encapsulated link layer frame;

(f) extracting the compressed form of the user data;

(g) decompressing the compressed user data; and (h) transmitting the user data to the remote data terminal device.

6. The method of claim 5, wherein said protocol is selected from the group of: TCP, ATM, and Frame Relay.

7. The method of claim 5, wherein said step of demodulating the modulated signal includes the step of demodulating the modulated signal according to a V.34 modulation standard.

8. The method of claim 5, wherein said step of demodulating the modulated signal includes the step of demodulating the modulated signal according to an integrated services digital network (ISDN) modulation standard.

9. A system for removing data traffic from a public switched telecommunications network (PSTN), which was designed for carrying voice traffic, comprising:

a switch within the PSTN connected to a data communication device, wherein said data communication device is configured to receive user data from a data terminal device for transmission to a remote data terminal device, to compress said user data, to encapsulate said compressed user data within a link layer frame, and to transmit a modulated signal corresponding to said link layer frame to said switch;

a remote access concentrator connected to said switch and connected to a data network, wherein said remote access concentrator includes a first network interface for receiving said modulated signal from said switch, means for demodulating said modulated signal to recover said link layer frame, and means for tunneling said link layer frame through said data network; and a network access controller connected to said data network, wherein said network access controller includes means for processing said tunneled link layer frames and means for transmitting said user data to said remote data terminal.

10. The system of claim 9, wherein said switch is a central office switch.

11. The system of claim 9, wherein said user data is asynchronous data.

12. The system of claim 9, wherein said means for tunneling include an encapsulator to encapsulate the link layer frames within a protocol.

13. The system of claim 12, wherein said protocol is selected from the group of: TCP, ATM, and Frame Relay.

14. A remote access concentrator adapted for connection to a telecommunication circuit switch and a data network comprising:

means for demodulating said modulated signal to recover a link layer frame;

means for encapsulating said link layer frame in a tunneling protocol;

means for transmitting the encapsulated link layer frame to the data network so as to enable traversing the data network without requiring processing of the contained link layer frame information by the data network.

* * * * *